United States Patent [19]

Sugino et al.

[11] Patent Number: 4,992,779
[45] Date of Patent: Feb. 12, 1991

[54] INFORMATION INPUT DEVICE

[75] Inventors: Toshio Sugino, Tokyo; Yoji Furuya, Inagi, both of Japan

[73] Assignee: Canon Kabushiki Kaisha, Tokyo, Japan

[21] Appl. No.: 321,174

[22] Filed: Mar. 9, 1989

[30] Foreign Application Priority Data

Mar. 30, 1988 [JP] Japan .................................. 63-74781

[51] Int. Cl.$^5$ .............................................. G09G 3/02
[52] U.S. Cl. .................................... 340/712; 340/706; 341/20; 341/23
[58] Field of Search ........................ 340/712, 706, 711; 178/18; 341/20, 23, 33, 34; 364/520; 273/148 B

[56] References Cited

U.S. PATENT DOCUMENTS

| | | | |
|---|---|---|---|
| 4,567,480 | 1/1986 | Blanchard | 340/712 |
| 4,725,694 | 2/1988 | Auer et al. | 340/712 |
| 4,763,356 | 8/1988 | Day, Jr. et al. | 340/712 |
| 4,821,029 | 4/1989 | Logan et al. | 340/712 |

FOREIGN PATENT DOCUMENTS 0110676  1/1984  European Pat. Off. ............ 340/712

Primary Examiner—Alvin E. Oberley
Assistant Examiner—M. Fatahiyar
Attorney, Agent, or Firm—Fitzpatrick, Cella, Harper & Scinto

[57] ABSTRACT

In an information input device for inputting information in an information processing apparatus by means of contact on an input surface provided on a display picture, an input-prohibiting area is provided on the input surface in response to setting a cleaning mode of the input surface, and the input-prohibiting area and an input-enabling area are discriminately displayed. At the same time, the brightness of the input surface is made high during the cleaning mode.

5 Claims, 9 Drawing Sheets

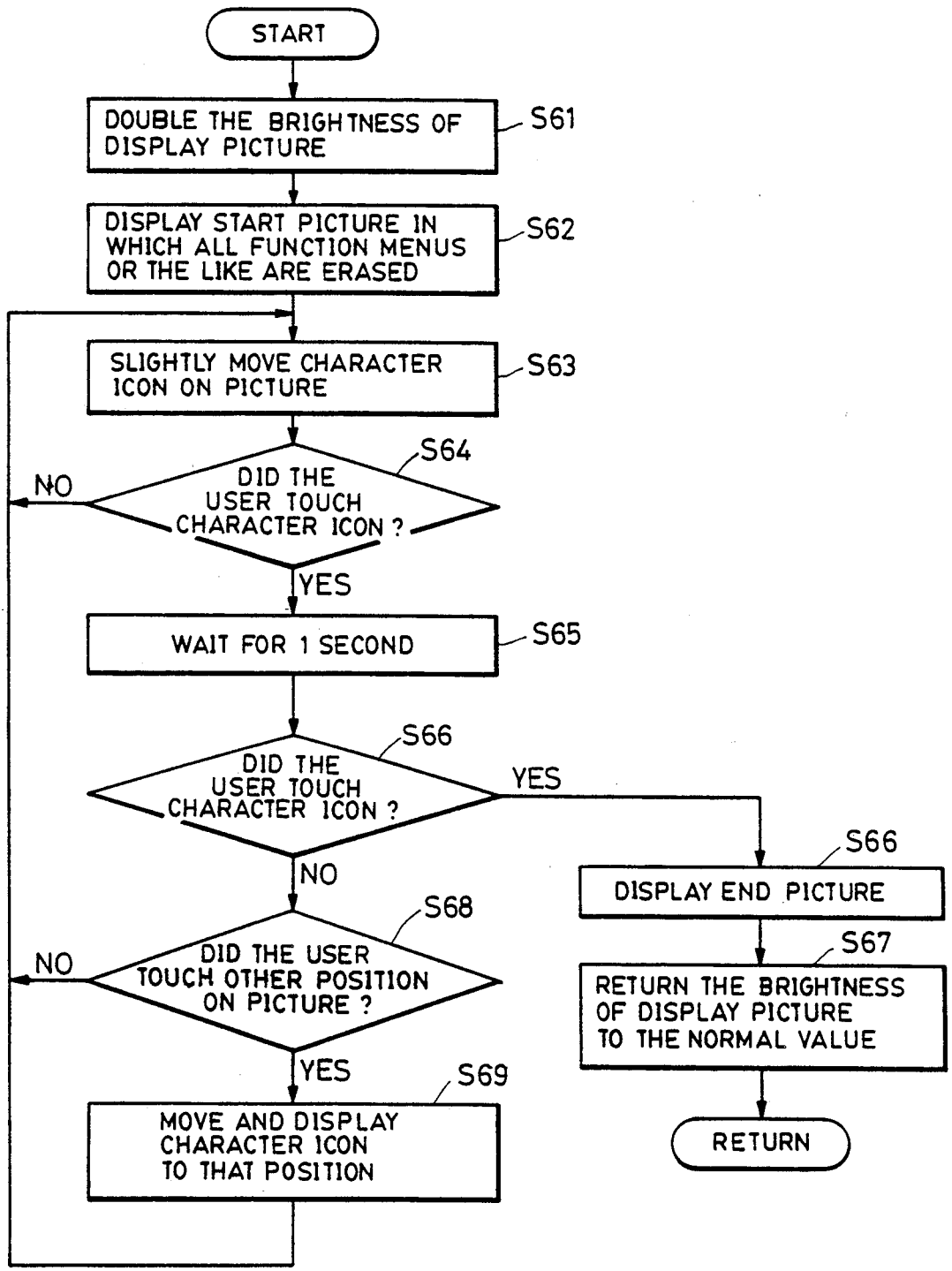

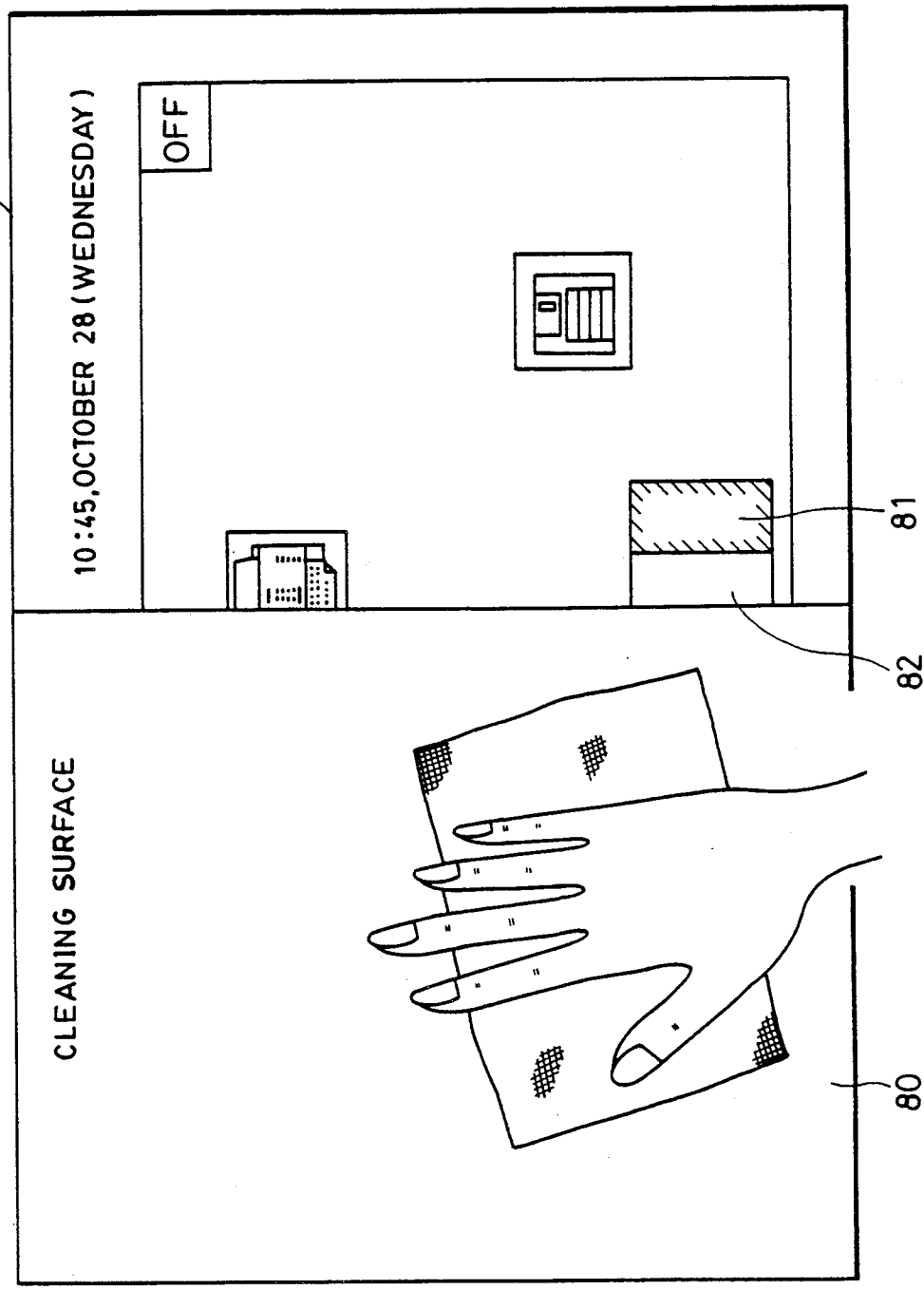

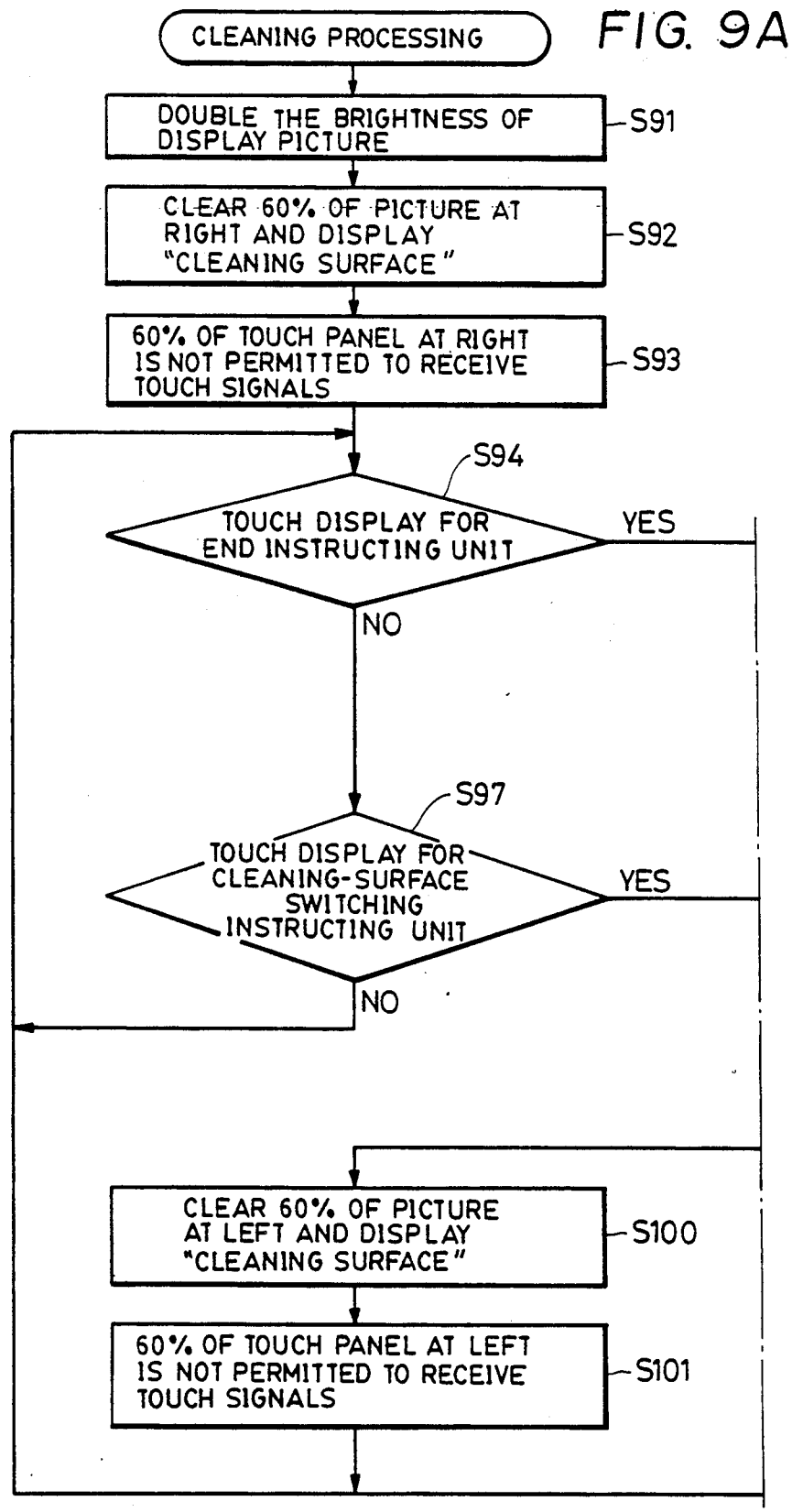

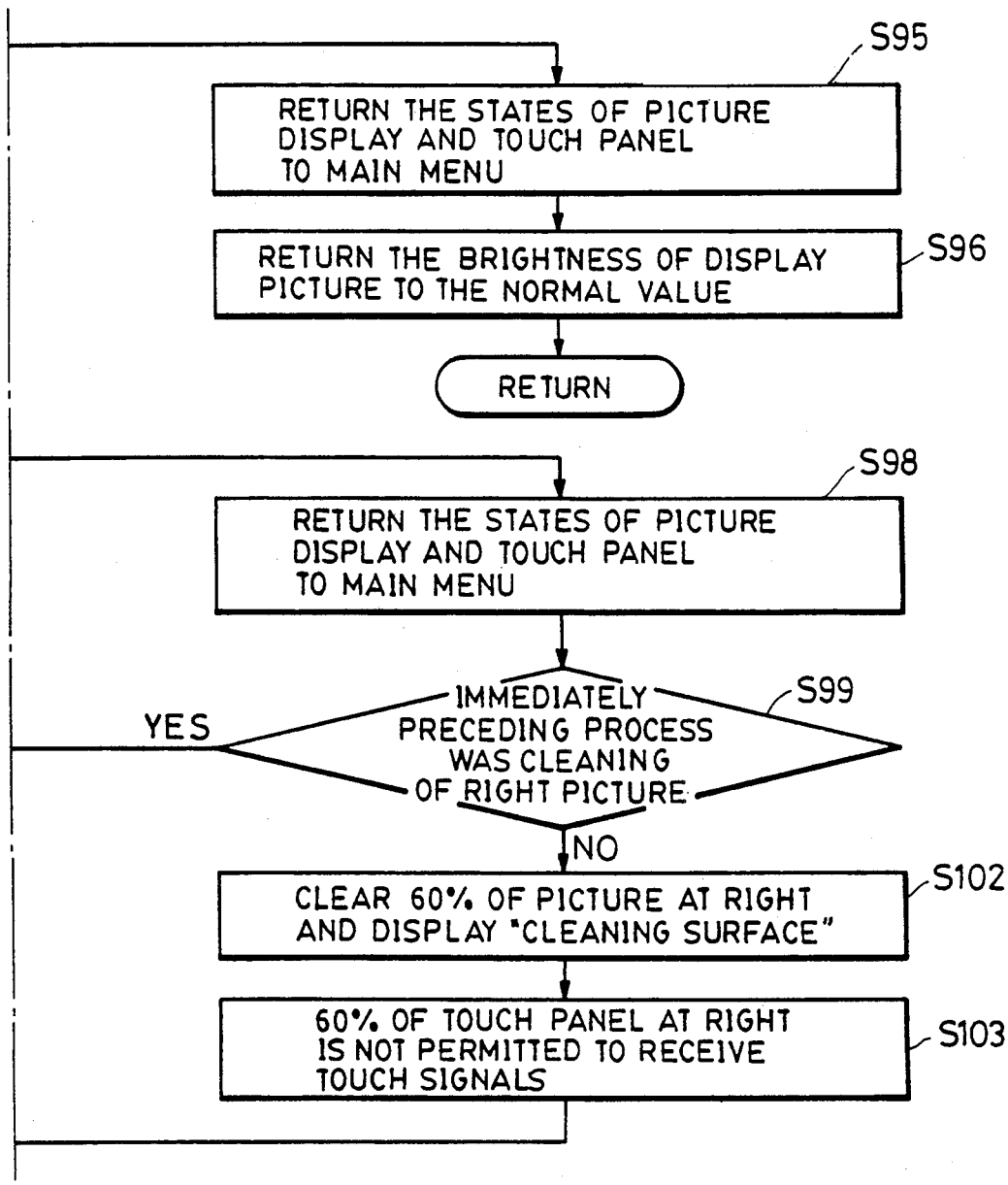

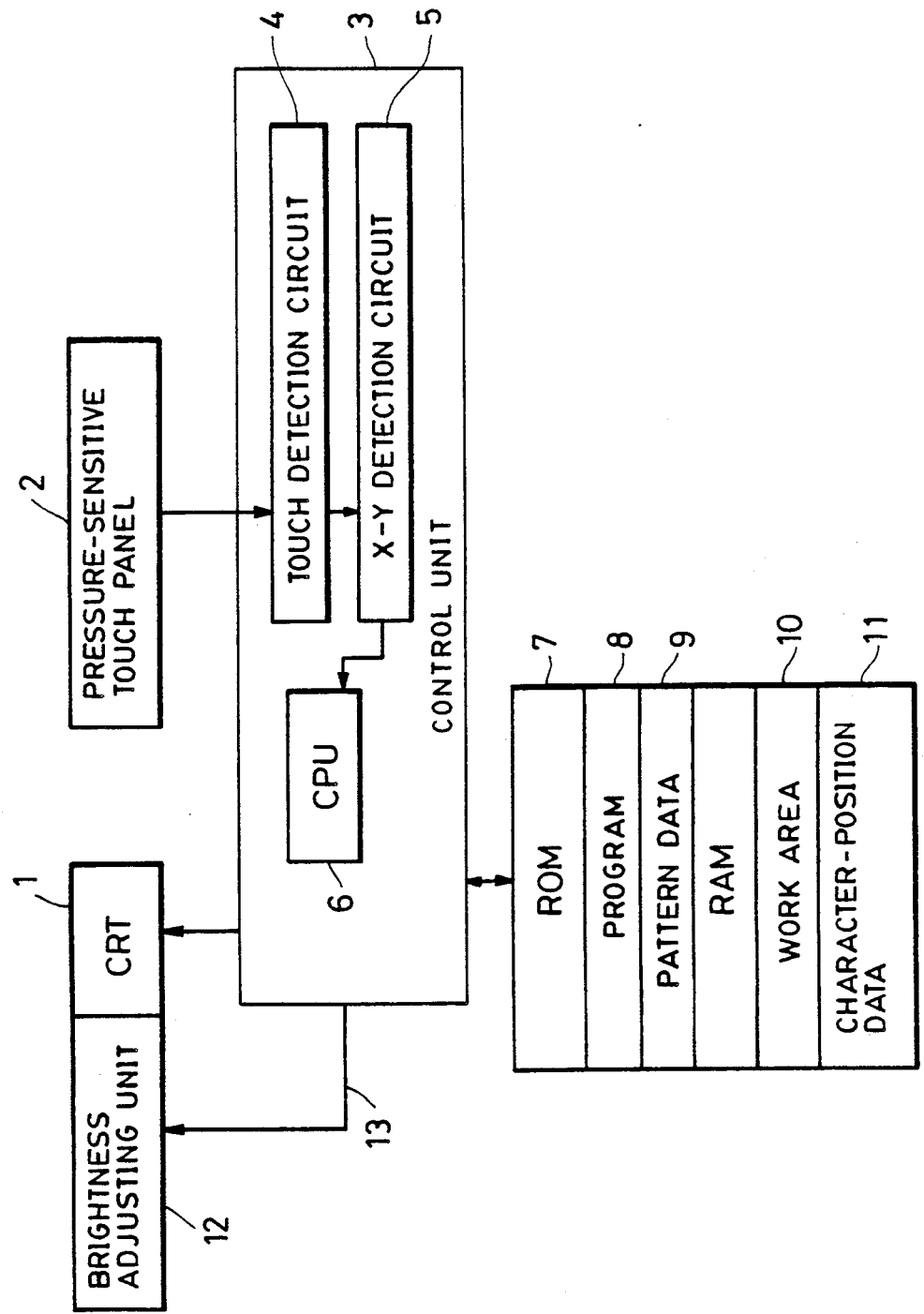

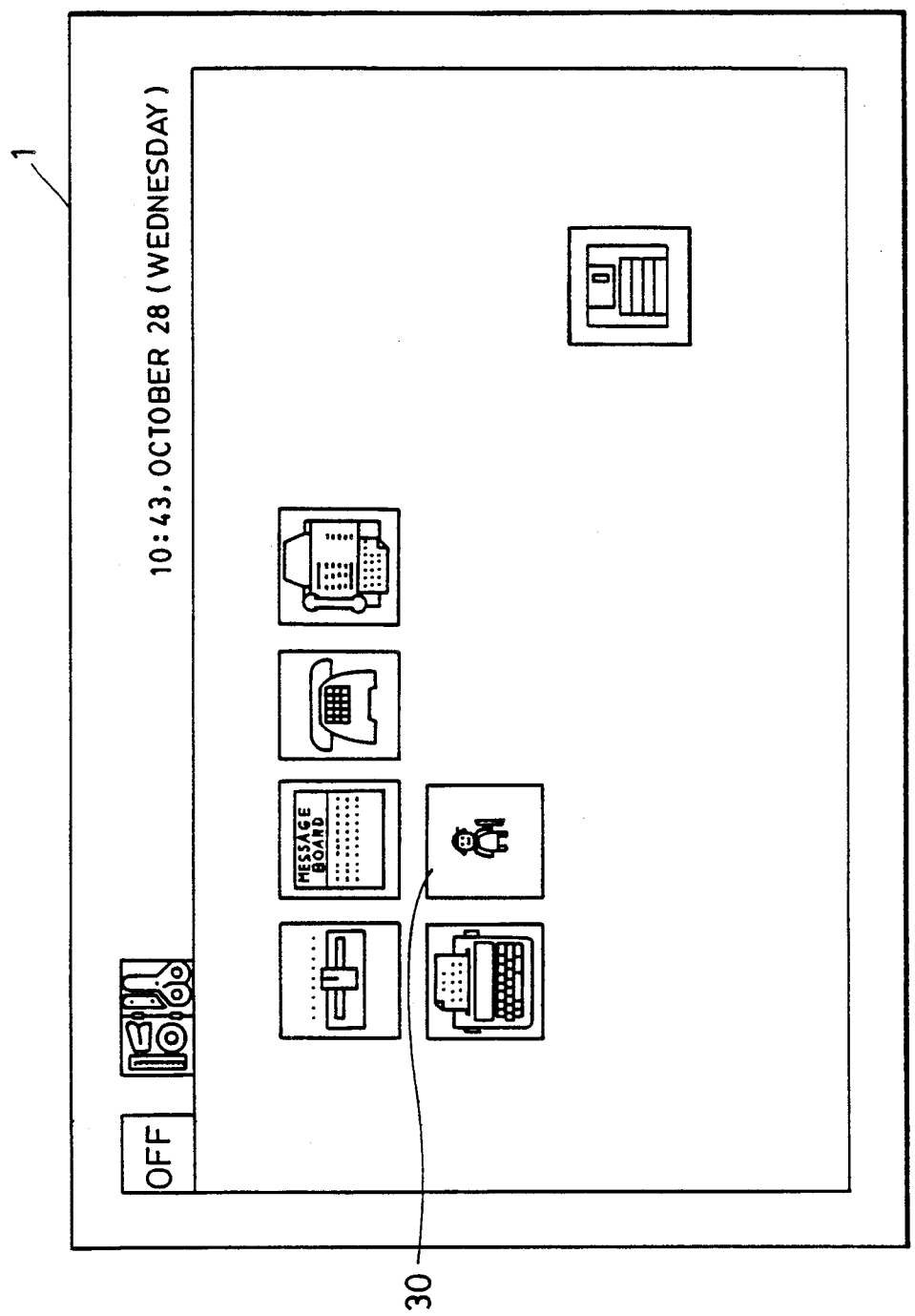

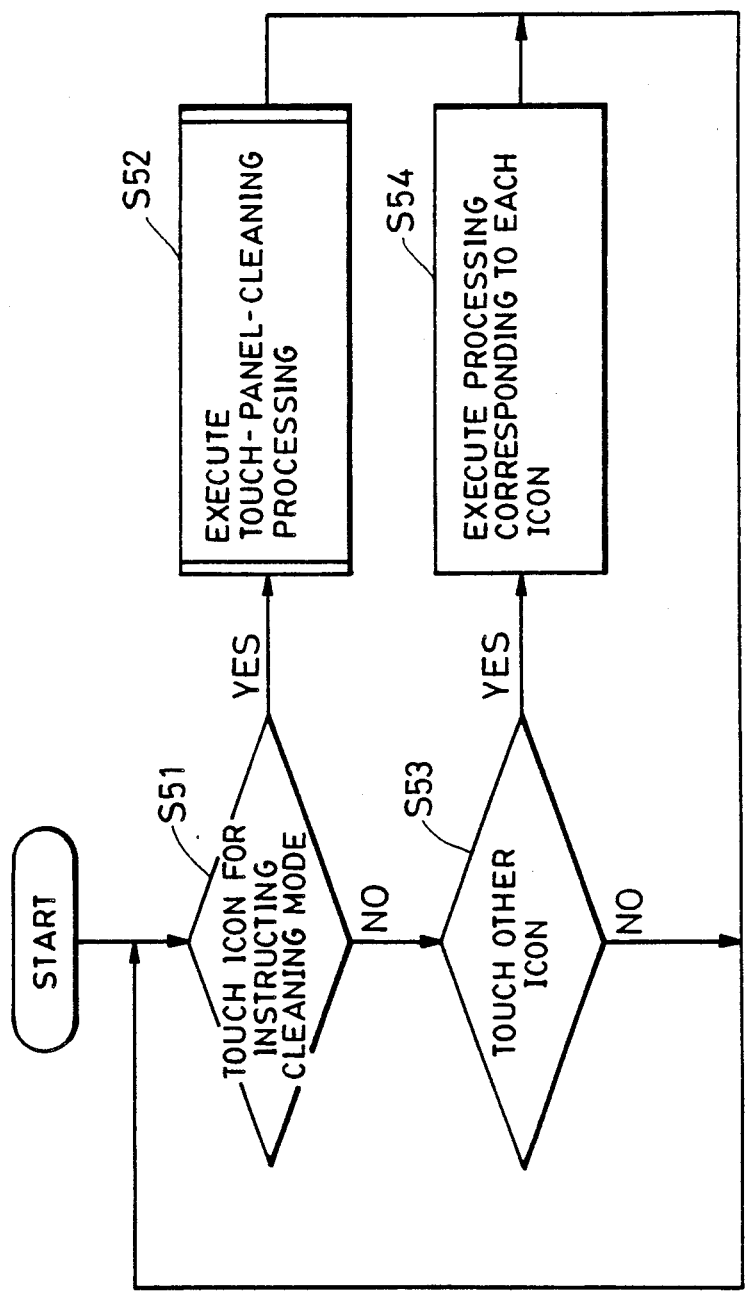

INFORMATION INPUT DEVICE

BACKGROUND OF THE INVENTION

1. Field of the Invention

This invention relates to an information input device for inputting information into an information processing apparatus, and more particularly relates to an information input device for inputting information into an information processing apparatus by means of contacting, for example, a finger or the like to an input surface.

2. Description of the Related Art

As an information input device of this kind, the so-called touch-panel input device comprising an ultrasonic digitizer and so forth is well known. Such a touch-panel device is incorporated in a computer system, or an information processing apparatus in which a computer is utilized, and comprises a transparently-constituted input unit which is used overlapped with a display surface of a display device in the information processing apparatus. While watching a display on the display device or the like through the transparent input unit of the touch panel device, the operator can perform position assignment, coordinate input or the like by means of contacting an instruction means, such as a pen, or a finger or the like to an input surface serving as the input unit of the touch-panel device. In general, the power supply of the touch-panel device is, for example, supplied from the main frame of the information processing apparatus, and is not turned on and off independently in the touch-panel device.

Since, in the touch-panel device, input is performed by means of contacting a pen, a finger or the like to the input surface, stains may adhere to the input surface due to the contact. In order to clean the stains, a touch-panel device has been proposed by the present inventors in U.S. patent application Ser. No. 183,637, filed Apr. 19, 1988, assigned in common with the present application, in which cleaning can be performed under the condition that the power supply of an information input device has been turned on, i.e., under the condition that the input of information is possible.

In this device, an input-disable region is set in the input surface when a cleaning mode has been set. Since input is not affected even when that region on the input surface is contacted by a cloth or the like for the purpose of cleaning, cleaning of the input surface can be performed with turning off the power supply. Further, since the input-disable region can be freely moved on the input picture, cleaning can be performed over the entire input surface.

However, in the picture displayed through this touch-panel device, the background is not very bright, and hence stains on the input surface can not be clearly observed. Consequently, there is the problem that un-wiped portions or the like will remain, even when the operator believes the input surface has been wiped.

SUMMARY OF THE INVENTION

The present invention has been made taking into consideration the above-described problem. It is an object of the present invention to provide an information input device in which stains on an input surface can be easily recognized, and cleaning of the input surface is made easier, by means of increasing the brightness of the input surface when a cleaning mode of the input surface has been assigned.

BRIEF DESCRIPTION OF THE DRAWINGS

FIG. 1 is a block diagram showing a schematic configuration of a first embodiment of an information input device in accordance with the present embodiment;

FIG. 3 is a diagram showing a picture of a main menu of the device of the first embodiment;

FIG. 5 is a flow chart of a process in which a cleaning mode is accessed;

FIG. 6 is a schematic flow chart of a cleaning mode function in the first embodiment;

FIGS. 7 and 8 are diagrams showing cleaning states in a second embodiment of the present invention; and FIGS. 9A, 9B and 9 are schematic flow charts of a cleaning process in the second embodiment.

DESCRIPTION OF THE PREFERRED EMBODIMENTS

Figure 7:
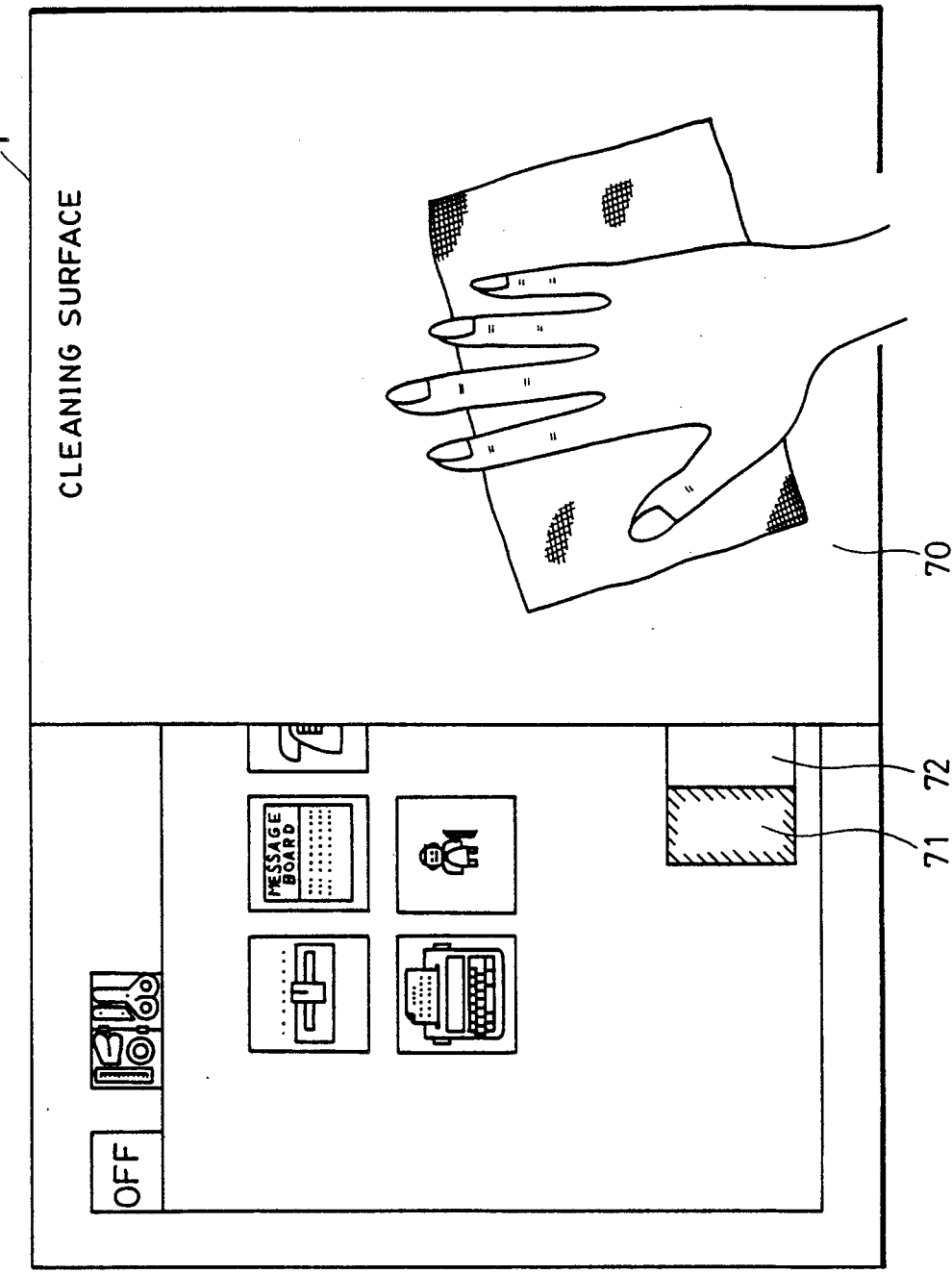

Now, preferred embodiments of the present invention will be hereinafter explained in detail with reference to the drawings. It is to be noted that an information input device in the embodiments to be explained hereafter is configured as a touch panel, and performs information input by detecting a contacted coordinate position by a well-known method. An explanation of the details of the input method will therefore be omitted.

[Explanation of the Configuration of the Information Input Device (FIG. 1)]

FIG. 1 is a block diagram showing a schematic configuration of an information input device configured as a touch-panel device in a first embodiment of the present invention.

In FIG. 1, on the surface of a CRT display unit 1, there is provided a transparent pressure-sensitive touch panel 2. The operator may touch the touch panel 2 while watching a display on the CRT display unit 1. The touch is detected by a touch detection circuit 4 in a control unit 3, and a detected signal corresponding to the position of the touched input point is output.

The detected signal of the touch detection circuit 4 is then input in an X-Y detection circuit 5. This circuit 5 detects the (x, y) coordinate of the touched input point of the touch panel 2, and outputs the detected data to a CPU 6.

The control unit 3 is provided with the above-described touch detection circuit 4, the X-Y detection circuit 5 and other elements as appropriate, as well as a CPU 6, such as a microprocessor or the like, which controls the entire device and performs control in accordance with control programs stored in a program area 8 of a memory 7. An ROM unit of the memory 7 includes the program area 8 for storing control programs for the CPU 6, a pattern data area 9 for storing character pattern storing image data for a cleaning mode which is to be described later, several kinds of character patterns or the like, and a dictionary or the like. An RAM unit of the memory 7 includes an area 10 used as a work area of the CPU 6, and a character-position data area 11 for storing display positions of character patterns, or the like. A brightness adjusting unit 12 of the CRT 1 makes the display of the CRT 1 light (makes the brightness high) when a highlight signal 13 from the control unit 3 is on, and makes the display of the CRT 1 dark when the highlight signal 13 is off.

Figure 2:
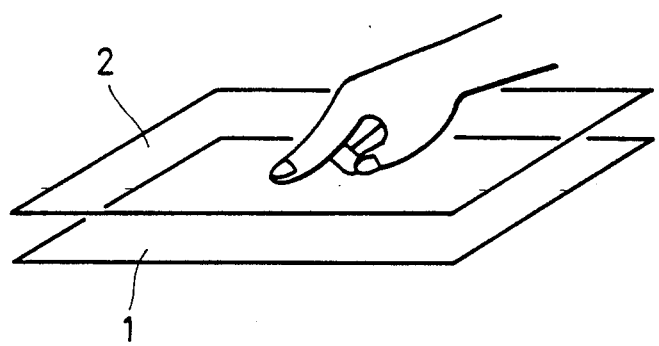
FIG. 2 is a diagram showing an application mode of a touch panel.

FIG. 2 is a diagram showing a state of a touch input from the touch panel 2.

By contacting the position of the corresponding item, figure or the like with a finger or the like while watching the display picture of the CRT 1, the operator can perform the assignment of an item, or a coordinate input in the picture of the CRT 1.

[Setting and Function of a Cleaning Mode (FIGS. 3 through 6)]

FIG. 3 shows a main menu display displayed on the picture surface of the CRT 1 by the application of the power supply of the present information processing apparatus.

Here, each function of the apparatus is displayed in the form of an icon. The operation is started when the operator touches the corresponding icon on the touch panel 2. When an icon 30 for assigning a cleaning mode is touched, the cleaning mode is started.

Figure 4:
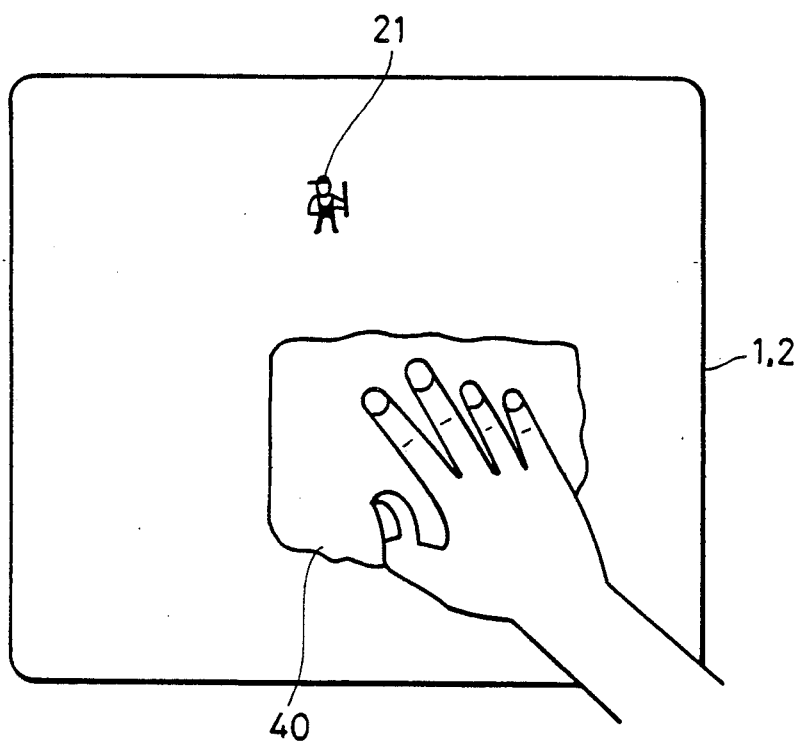
FIG. 4 is a diagram showing a cleaning state of a touch panel surface in the first embodiment.

FIG. 4 is a diagram showing a state of cleaning by the operator in the cleaning mode.

In FIG. 4, there is shown a character pattern 21 indicating the cleaning mode, the pattern data of which is stored in the pattern data area 9 of the memory 7, and which is displayed moving right and left on the picture of the CRT 1. There is also shown in FIG. 4 a cloth 40 which is used for cleaning by the operator. Here, an input-enabling region of the touch panel 2 is limited to the region where the character pattern 21 is displayed. Hence, there is no danger of input in other regions which are input-prohibiting even when these regions are contacted for the purpose of cleaning.

When the character pattern 21 is displayed on an area which is to be cleaned, it disturbs cleaning of that area. To shift the character pattern 21, first the character pattern 21 is touched, and subsequently another position on the picture is touched. By this means, the character pattern 21 is shifted to that other position. Thus, by shifting the character pattern 21 outside the intended cleaning area, it is possible to perform cleaning of the region in which cleaning has not yet been completed within the picture surface of the CRT 1. The release of the cleaning mode is performed by halting the movement of the character pattern 21 by touching the character pattern 21 twice in succession.

In the state of FIG. 4, regions other than that in which the character pattern 21 is displayed are white in color, and since the entire CRT 1 has high brightness, stains on the transparent input surface of the touch panel 2 can be clearly confirmed.

FIG. 5 is a flow chart showing the start operation of the cleaning mode in the device of the first embodiment. The control program shown in the flow chart is stored in the program area 8.

The main menu as shown in FIG. 3 is displayed at step S51. When the icon 30 for assigning the cleaning mode is touched, the process proceeds to step S52, where the cleaning mode of the touch panel 2 shown in the flow chart of FIG. 6 is started, and the display content of the CRT 1 becomes as shown in FIG. 4. When, among icons such as shown in FIG. 3, an icon other than the icon 30 for assigning the cleaning mode has been touched at step S53, the execution of a function program corresponding to the touched icon is started at step S54.

FIG. 6 is a schematic flow chart showing the processing of the touch-panel cleaning function shown in step S52 in FIG. 5.

At step S61, the highlight signal 13 is output to double the brightness of the displayed picture on the picture surface of the CRT 1. At step S62, all the displays, such as function menu or the like, are erased, and the character pattern (the pattern facing backward) shown by the character pattern 21 in FIG. 4 is displayed on the CRT 1 as a starting picture. At step S63, the character pattern 21 is slightly shifted to one direction (right or left). At this time, the position data 11 showing the position of the character pattern 21 in the memory 7 is also updated. The character pattern 21 is displayed in such a way that, when it is moved, for example, in the right direction and reaches the right end of the picture surface, it is then moved in the left direction.

At step S64, it is investigated whether the character icon 21 has been touched or not. The investigation is performed by comparing the input coordinate value from the X-Y detection circuit 5 with the character-position data 11, and seeing whether the two values coincide with each other. When the values coincide with each other (when the character pattern 21 has been touched), the process proceeds to step S65, where the character pattern 21 is made turn round and waiting is done for 1 second. Then, at step S66, it is investigated again whether the character pattern 21 has been touched or not. If it has been touched, the process proceeds to step S66, where an end picture of the cleaning mode is displayed (in this embodiment, the character pattern 21 faces front and bows) and the cleaning mode is released. Then, at step S67, the highlight signal 13 is turned off, and the brightness of the displayed picture of the CRT 1 is returned to the initial value by the brightness adjusting unit 12.

When the character pattern 21 has not been touched at step S66, the process proceeds to step S68, where it is investigated whether another position on the picture surface has been touched or not. When an other position on the picture has been touched, the process proceeds to step S69, where the character pattern 21 is moved and displayed to that other position, and the process is returned again to step S63.

It is to be noted that background music may be provided during the cleaning mode.

[Explanation of the Second Embodiment (FIGS. 7 through 9)]

FIGS. 7 and 8 are diagrams explaining the function of a second embodiment of the present invention.

FIG. 7 shows a case in which the right half, approximately, of the main menu picture is assigned as a cleaning surface 70, and all input on the cleaning surface 70 is prohibited. On the other hand, the menu is still displayed and input is still possible on the left half of the picture. By touching a switching instructing unit 71 extending from the cleaning surface 70, the cleaning surface 70 is switched so as to be located at the left of the picture surface as shown in FIG. 8. By touching an end instructing unit 72 extending from the cleaning surface 70, the end of the cleaning function can be instructed.

FIG. 8 shows a case in which the cleaning surface 70 is moved to the right of the picture surface and becomes a cleaning surface 80. As is apparent in comparing with FIG. 7, in FIG. 8, the switching instructing unit 71 for the picture and the end instructing unit 72 for the cleaning function are moved and displayed to positions 81 and 82 in accordance with the movement of the cleaning surface 70. It is to be noted that, also in this case, since the entire picture including the cleaning surface is displayed in high brightness by the highlight signal 13, stains on the input surface can be clearly confirmed.

FIG. 9 is a flow chart of the processing of the cleaning function of the second embodiment.

When the cleaning mode is started by touching the icon 30 in the main menu display shown in FIG. 3, the highlight signal 13 is output to double the brightness of the CRT 1 by the brightness adjusting unit 12 at step S91. At step S92, about 60% of the picture at the right side is cleared, and "cleaning surface" is displayed on an upper portion of the picture. Then, at step S93, the touch panel 2 is disabled such that touch signals are not received in response to contact with the cleaning surface 70. At step S94, it is investigated whether the end instructing unit 72 for the cleaning mode has been touched or not. When it has been touched, the process proceeds to step S95, where the picture display is returned to the initial main menu, and input from the touch panel 2 is made receivable. Then, at step S96, the highlight signal 13 is turned off, and the display brightness of the CRT 1 is returned to the initial value.

When the switching instructing unit 71 for the cleaning surface 70 has been touched at step S97, the picture display is first returned to the initial state (the main menu display) at step S98. At step S99, it is investigated whether the right side of the picture has been the cleaning surface 70 in the immediately preceding state. When the answer is yes, the process proceeds to step S100, where about 60% of the picture at the left side is cleared to make it the cleaning surface 70 as shown in FIG. 8. At step S101, the left portion of the touch panel 2 corresponding to the cleaning surface 70 is made a region in which touch signals are not received.

When the right side of the picture was not the cleaning surface 70 in the immediately preceding state at step S99, the process proceeds to step S102, where about 60% of the picture at the right side is cleared and made the cleaning surface 70, as shown in FIG. 7. Then, at step S103, input at the portion corresponding to the cleaning surface 70 is prohibited.

It is to be noted that, although, in these embodiments, an explanation has been made such that the picture is divided into two portions at the left and right, the present invention is not limited thereto. It goes without saying that, for example, the picture may be divided into upper and lower portions, and, further, it is not limited to two divisions.

Further, for example, an icon showing an input-enabled area may be displayed on a corner of the picture surface, and regions in which the icon is not displayed may first be cleaned. Then, when regions near the icon are cleaned, the icon may be touched and moved to another corner. At this time, the cleaning mode may be released by continuously touching the icon.

In these embodiments, during the cleaning mode, the brightness of the CRT picture is made to increase in order to increase the brightness of the input surface. However, for example, an electric lamp or the like may be provided around the input surface, and the input surface may be made light by lighting the lamp or the like.

As explained above, according to the present embodiments, the brightness of the input picture becomes high in the mode for cleaning the input surface. Hence, stains on the input surface can be clearly confirmed, and inconveniences, such as the presence of unwiped portions, incomplete cleaning or the like, do not occur.

As explained above, according to the present invention, the input surface becomes light in the cleaning mode. Hence, the present invention has the effects that stains or the like on the input surface can be clearly confirmed, and portions in which cleaning or wiping has not been performed disappear.

What is claimed is:

1. An information input device for inputting information into an information processing apparatus by means of contact on an input panel provided on a picture surface of a display device, said information input device comprising:

mode setting means for setting a cleaning mode of the input panel on the picture surface of said display device;

input control means for setting an input-prohibiting area of information on said input panel in response to setting the cleaning mode by said mode setting means;

prohibiting-area display means for displaying an indication on the picture surface of said display device that the input-prohibiting area of information has been set on said input panel by said input control means; and brightness control means for increasing the brightness of a displayed picture on the picture surface of said display unit in response to setting the cleaning mode by said mode setting means.

2. An information input device according to claim 1 further comprising prohibiting-area changing means for changing the location of the input-prohibiting area set by said input control means on said input panel.

3. An information input device according to claim 1, wherein said mode setting means sets the cleaning mode in response to contact with a character position displayed on the picture surface of said display device via said input panel.

4. An information input device for inputting information into an information processing apparatus by means of contact on an input panel provided on a picture surface of a display device, said information input device comprising:

mode setting means for setting a cleaning mode of the input panel on the picture surface of said display device;

input control means for dividing an input surface of said input panel into two areas in response to setting the cleaning mode by said mode setting means, and setting one area as an area for prohibiting the input of information, and another area as an area for enabling the input of information;

area display means for displaying an indication that the input-prohibiting area and the input-enabling area have been set on said input panel by said input control means;

area switching means for exchanging the input-prohibiting area with the input-enabling area set by said area display means; and brightness control means for increasing the brightness of a displayed picture on said picture surface of said display device in response to setting the cleaning mode by said mode setting means.

5. An information input device according to claim 4, wherein said mode setting means sets the cleaning mode in response to contact with a character position displayed on the picture surface of said display device via said input panel.

* * * * *

UNITED STATES PATENT AND TRADEMARK OFFICE
CERTIFICATE OF CORRECTION

PATENT NO. : 4,992,779
DATED : February 12, 1991
INVENTOR(S) : TOSHIO SUGINO ET AL.

It is certified that error appears in the above-identified patent and that said Letters Patent is hereby corrected as shown below:

COLUMN 4

Line 26, "turn round" should read --to turn around--.
Line 40, "an other" should read --another--.

Signed and Sealed this

Fifth Day of January, 1993

Attest:

DOUGLAS B. COMER

Attesting Officer

Acting Commissioner of Patents and Trademarks